United States Patent

Beck

[15] 3,641,268

[45] Feb. 8, 1972

[54] REAL-TIME IMAGE CONTRAST AND EDGE SHARPNESS ENHANCING APPARATUS

[72] Inventor: Cyrus Beck, Abington, Pa.

[73] Assignee: The United States of America as represented by the Secretary of the Navy

[22] Filed: July 24, 1969

[21] Appl. No.: 844,540

[52] U.S. Cl. .................................... 178/7.3 R, 178/DIG. 34
[51] Int. Cl. ......................................................... H04n 5/14
[58] Field of Search .................... 178/7.3, 7.2, 7.5 E, 7.1 AC, 178/7.6 CE

[56] References Cited

UNITED STATES PATENTS

| | | | |
|---|---|---|---|
| 2,678,389 | 5/1954 | Loughlin | 178/7.1 AC |
| 2,851,522 | 9/1958 | Hollywood | 178/7.1 AC |
| 3,153,207 | 10/1964 | Brown | 178/7.5 E |
| 3,472,950 | 10/1969 | Izumi et al. | 178/7.5 E |

*Primary Examiner*—Robert L. Griffin
*Assistant Examiner*—Richard P. Lange
*Attorney*—Edgar J. Brower, Henry Hansen and B. Frederick Buchan, Jr.

[57] ABSTRACT

Apparatus for enhancing contrast and edge sharpness of images visually displayed by a line scan imaging and display system wherein an electrical analog output signal of a line scan imaging system which may be degraded is processed in real time by enhancing circuitry producing corrective signals of adjustable magnitude for addition to the degraded signal to provide an enhanced brightness intensity modulating signal for a video display. The enhancing circuitry includes differentiating circuitry for obtaining the first and second derivatives of the degraded signal in turn applied to enhancer circuitry for causing the polarity of the first derivative to be always opposite to that of the second derivative so that the relative amplitudes of higher frequencies are emphasized. The polarity adjusted first derivative is added to the degraded signal to make the displayed image more crisp by reason of enhanced edge sharpness. A second polarity adjusted signal is developed by causing the polarity of the degraded signal to follow that of the first derivative. An integration of the second polarity adjusted signal wherein the relative amplitude of low frequencies are emphasized is added to the degraded signal to enable a visual display of greater contrast.

16 Claims, 3 Drawing Figures

INVENTOR.
CYRUS BECK

REAL-TIME IMAGE CONTRAST AND EDGE SHARPNESS ENHANCING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention generally relates to displays and, more particularly, relates to means for enhancing degraded output signals of line-scan-imaging systems.

Conventional line scan imaging systems generally provide an output signal amplitude varying in accordance with the variation in intensity of the particular line being scanned. The output signal may often be degraded by reason of interference such as air turbulence or image motion blurring between the object being scanned and the sensor of the line scan imaging system. Some techniques for enhancing edge sharpness effect undesirable changes in relative contrast along the line being scanned. Known techniques for improving relative contrast deleteriously affect image edge sharpness or increase the noise level.

BRIEF SUMMARY OF THE INVENTION

Accordingly, it is the general purpose of the invention to provide means for enhancing not only edge sharpness but also relative contrast in a visual representation of an image as established by a brightness intensity modulating electrical signal such as the output signal of a line scan imagining system.

The general purpose and other objects of the invention are briefly accomplished by providing enhancing circuitry operable to develop corrective signals in real time from a degraded signal a first of which emphasizes the amplitudes of lower frequencies and a second of which emphasizes the amplitudes of higher frequencies. The invention comprehends differentiating circuitry for providing the first and second derivatives of the degraded signal and an edge sharpness enhancer having a polarity detector driving a polarity reversing switch so that the corrective output signal therefrom generally represents the magnitude of the first derivative in real time which continually has been adjusted to have a polarity opposite that of the second derivative. The invention also comprehends a contrast enhancer including a detector for comparing the polarities of the first derivative and the degraded signal and driving a polarity reversing switch to provide a polarity adjusted degraded signal which continually has the same polarity as that of the first derivative and which is integrated. It is contemplated that the magnitudes of the corrective signals to be added to the degraded signal be adjustable to enable an operator to obtain a display exhibiting the best subjective combination of contrast and edge sharpness.

DESCRIPTION OF THE PREFERRED EMBODIMENT

Figure 1:
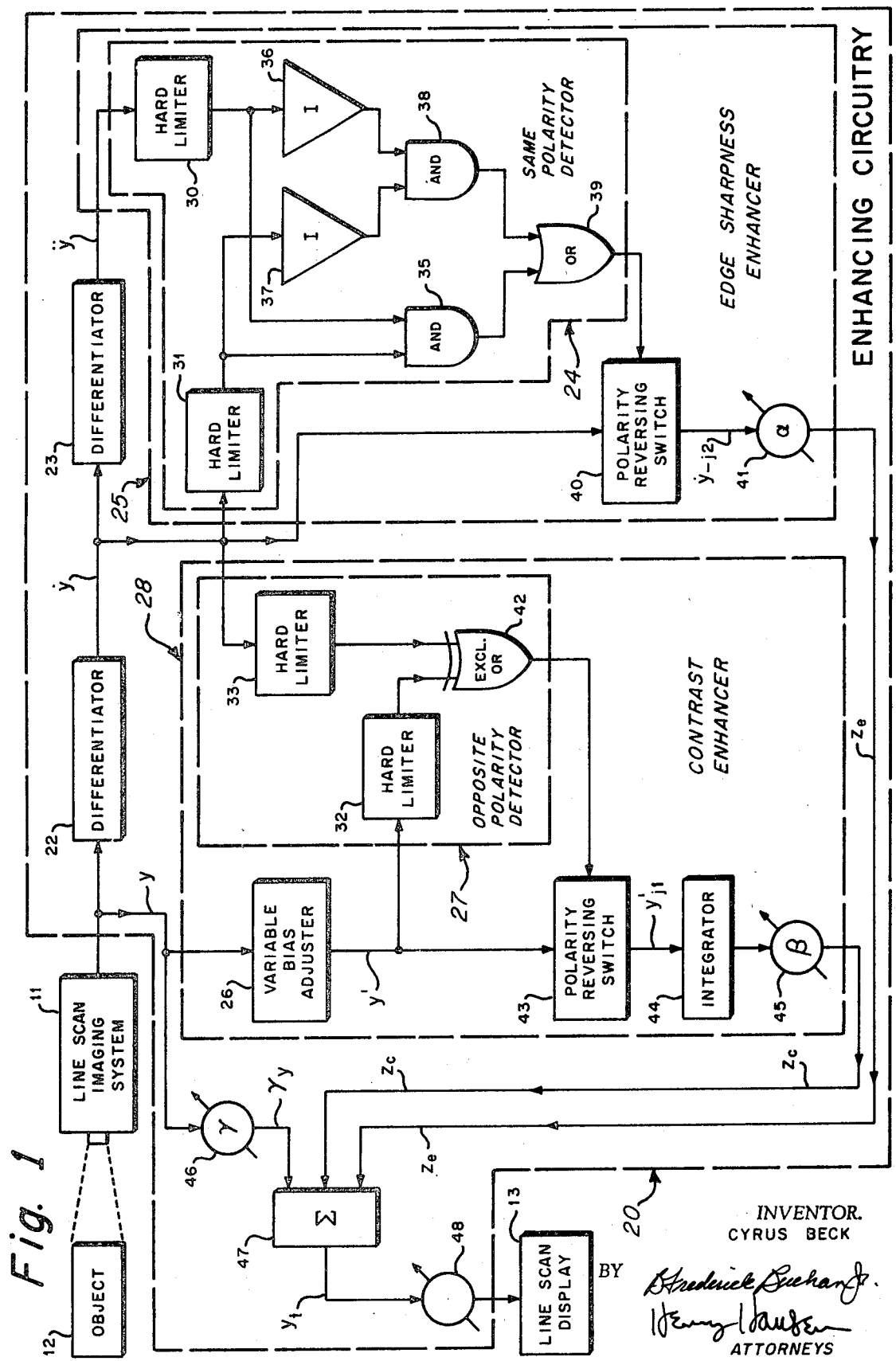
FIG. 1 represents a partial block and schematic diagram of an imaging system with display including enhancing circuitry according to the invention.

Referring now to FIG. 1, a conventional line-scan-imaging system 11 is focused to view a remote object 12 and provide an electrical analog output signal which varies in amplitude in accordance with the relative intensity of successive portions of the particular line being scanned. Generally, the system 11 provides, rather than an AC signal, an intensity varying DC signal suitable for intensity modulating the visual output of a conventional line scan display 13 such as a television monitor, the minimum intensity level usually corresponding to the dark current level for the imaging system. The apparatus for synchronizing the line scan display 13 with the line scan imaging system 11 is conventional and is not shown in FIG. 1. Because of imperfections in the transmission path from the object 12 to the system 11 such as turbulent air, because of image motion blurring or because of other reasons including imaging system behavior which is similar to a low-pass spatial filter, the system output signal may be degraded in that it may not be capable of causing the system display 13 to reproduce the image of the object exactly as it really is.

The degraded output signal of the system 11 is, therefore, applied to enhancing circuitry generally designated 20 to first and second, serially connected differentiators 22 and 23 which provide analog output signals $\dot{y}$ and $\ddot{y}$ generally indicative of, respectively, the first and the second derivatives of the output signal of the system 11 hereinafter referred to as the degraded signal, $y$. The degraded signal $y$ along with the output signals $\dot{y}$ and $\ddot{y}$ of the differentiators 22 and 23 are applied to edge sharpness and contrast enhancers for subjection to a type of processing called "janitizing."

The term "janitizing" as used herein means a process of making any signal varying with respect to a reference level either always have the same polarity as ("plus janitizing") or always have an opposite polarity ("minus janitizing") with respect to any other signal varying relative to its respective reference level. Basically, "janitizing" is accomplished by applying the two signals involved to a polarity comparator or detector which provides an indication as to whether or not the input signals have the same polarity relative to their respective reference levels. The polarity detector output signal is applied to a polarity reversing switch to cause a polarity adjustment in the signal being "janitized" at the appropriate times.

As will hereinafter be explained in greater detail, it is desired that a correction signal of adjustable magnitude for enhancing edge sharpness be developed by "minus janitizing" the first derivative of the degraded signal with respect to the second derivative of the degraded signal. Additionally, it is desired to develop a second correction signal of adjustable magnitude for enhancing image contrast by integrating the result of "plus janitizing" the degraded signal with respect to the first derivative of the degraded signal. Accordingly, the output signals $\dot{y}$ and $\ddot{y}$ of the differentiators 22 and 23, being both referenced to a level of zero volts, are applied to a same polarity detector 24 in an edge sharpness enhancer 25. The output signal $\dot{y}$ of the differentiator 22 and a bias adjusted form $y'$ of the degraded signal $y$, having been rebiased to have a predetermined reference level by a conventional variable bias adjuster 26, are applied to an opposite polarity detector 27 in a contrast enhancer 28. It is convenient to use a bias adjuster 26 capable of shifting to a reference level of zero volts that level of the degraded signal $y$ such as one which eliminates a background noise level or bias level intensity $y_b$ or one which is midway between the dark current and saturation current levels of the output signal of the system 11. Generally, the polarity detector 24 or 27 may be fabricated from conventional digital logic circuits and includes conventional hard limiter devices 30 and 31 or 32 and 33 for changing the applied input analog signal to digital form such as rectangular output waveforms having level transitions corresponding in time to polarity reversals.

In the same polarity detector 24 in the edge sharpness enhancer 25, the output waveforms of the limiters 30 and 31 are each applied to an AND-gate 35 and to respective ones of a pair of inverters 36 and 37 whose output signals, in turn, are provided to a second AND-gate 38. The output signals of the AND-gates 35 and 38 are fed through an OR-gate 39 and comprise the detector output signal which is, in turn, fed from the detector 24 to cause when in a logical ONE state a reversal of the polarity of the output signal of a conventional polarity reversing switch 40.

The switch 40 is connected to receive as an input signal the first derivative output signal ẏ from the differentiator 22. The polarity reversing switch 40 may, for example, comprise a double pole, relay-driven switch controlled by the detector output signal and having a pair of relay-driven contacts arranged to contact alternatively first and second or second and third contact members, the first and third contact members being electrically connected together. The minus janitized analog output signal $$\dot{y}_{-j2}$$

of the polarity reversing switch 40 is applied through a conventional analog signal amplitude adjusting device 41 such as an amplifier or an attenuator for introducing into the applied analog signal a desired amplitude adjustment of magnitude $\alpha$, either greater or less than one and providing the edge sharpness enhancing correction signal $z_e$ of desired magnitude.

In order to indicate that a signal have been plus or minus janitized the symbology of the positive or negative subscript $j_n$ for the signal is adopted herein, the term $n$ being any integer including zero which corresponds to the order of the derivative of the signal with respect to which the signal is being "janitized." For example, since the degraded signal from the imaging system 11 has been designated $y=f(t)$ and its first derivative designated ẏ, the minus janitized signal from the switch 40 in the enhancer 25 is designated $$\dot{y}_{-j2}$$

to indicate that the first derivative of $y$ is to be minus janitized with respect to the second derivative of $Y$.

The opposite polarity detector 27 in the contrast enhancer 28 includes a conventional EXCLUSIVE OR-gate 42 receiving as input signals the output signals of the limiters 32 and 33 and providing a logical ONE as the detector output signal when the detector input signals have opposite polarity. The output signal of the opposite polarity detector 27 is applied to control a second polarity reversing switch 43 of conventional design connected to receive as an input signal the bias adjusted degraded signal $y'$ from the bias adjuster 26. The plus janitized output signal from the reversing switch 43 is designated $$y'_{j1}$$

wherein the prime indicates that the signal being plus janitized with respect to the first derivative of $y$ is the result of bias adjusting the degraded signal $y$, $y'$ equaling the instantaneous difference between $y=f(t)$ and the intensity $y_b$. A conventional analog signal integrator 44 is connected to receive $$y'_{j1}$$

as an input signal and provides an output signal $$\int_0^t y'_{j1} dt$$

which is applied, as in the enhancer 25, to a conventional analog signal amplitude adjusting device 45 for scaling to introduce an amplitude adjustment of magnitude $\beta$ and provide the contrast enhancing correction signal $z_c$ of desired magnitude.

The degraded signal $y$ from the imaging system 11 is also applied for scaling to analog signal amplitude adjusting device 46 for introducing an amplitude adjustment $\Gamma$, greater or less than one, set at the discretion of the operator. The signals $z_e$, $z_c$ and $\Gamma y$ from the adjusting devices 41, 45 and 46 are all combined by a conventional analog summing device 47 whose output signal $y_t$ is applied through yet another signal amplitude adjusting device 48 as a video signal to the display 13 to intensity modulate its visual output. The output signal $y_t$ of the summing device 47 may be expressed as:

$$y_t = \alpha \dot{y}_{-j2} + \beta \int_0^t y'_{j1} dt + \gamma y \qquad (1)$$

wherein the coefficients $\alpha$, $\beta$ and $\Gamma$ correspond to the degree of amplitude adjustment introduced by the adjusters 41, 45 and 46 as set by the operator.

An operator can tune the enhancing circuits 20 by adjusting the output levels of the adjusters 41, 45 and 46 to provide that enhanced video signal which enables the display 13 to exhibit a particular combination or composite of contrast and edge sharpness subjectively considered by the operator to be the best image. The intensity of the best composite of contrast and edge sharpness is, of course, set to optimum condition by setting the adjuster 48. The variable bias adjuster 26 is set to establish a polarity reference level for the signal $y$ such as to tune out background noise in order that the portion of the signal $y$ most probably attributable to the image being scanned can be processed to produce the contrast enhancing signal. Alternatively, it may be desirable in cases of images having repeated brightness variations to set the adjuster 26 so that the polarity reference level is established to correspond to the level which is midway between the maximum and minimum levels of brightness of the image.

Figure 2:
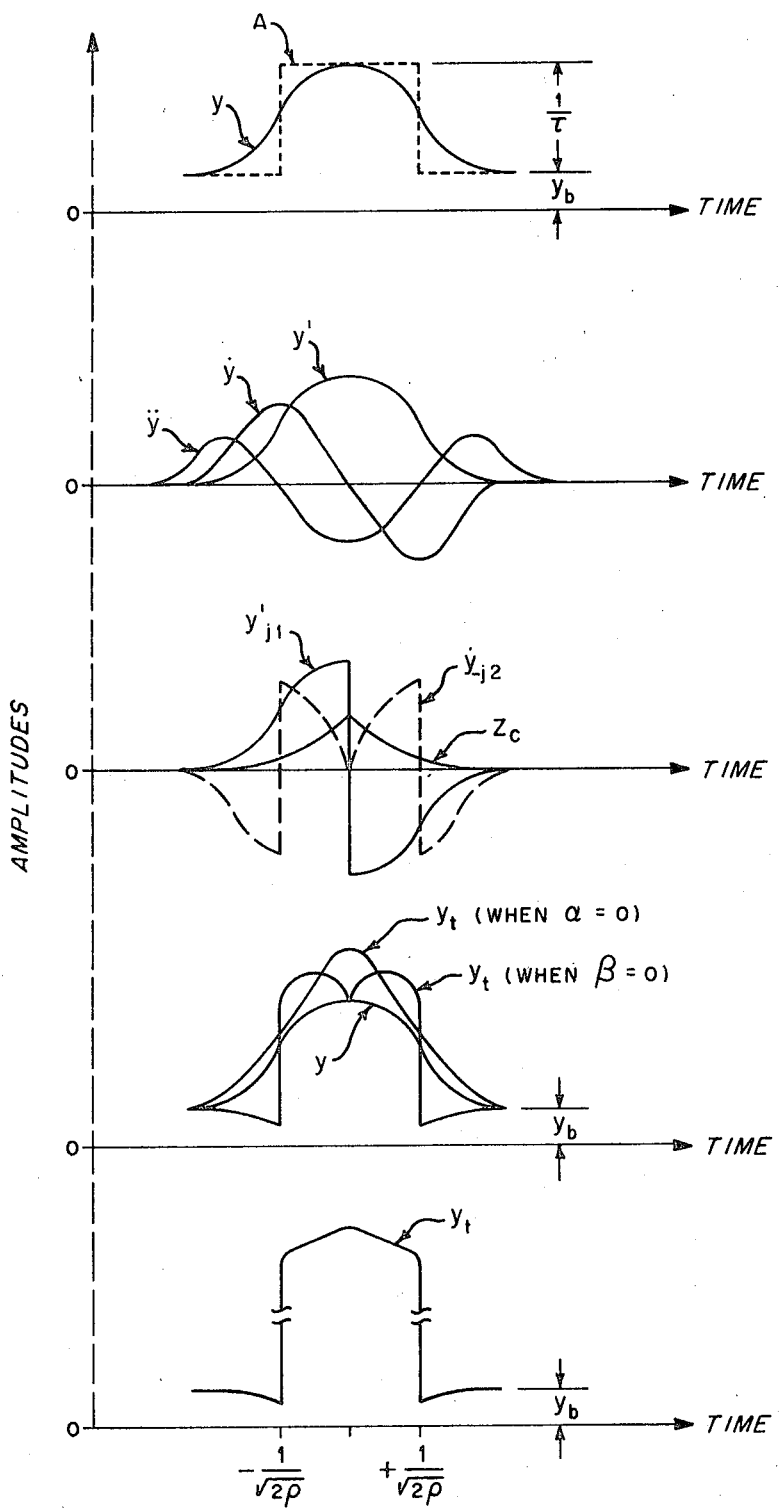
FIG. 2 represents a timing diagram of various signals present in the apparatus of FIG. 1 when a bar of constant brightness is being scanned.

Referring to FIG. 2, an example of processing the degraded output signal $y=f(t)$ produced in response to scanning across an image having sharply defined edges and a substantially constant intensity level may be helpful to an understanding of the apparatus of FIG. 1. Under the ideal conditions, the imaging system 11 should provide a rectangular pulse A of amplitude $11\tau$ whose width in time is a function of the scanning beam sweep velocity as shown in FIG. 2. Because conditions are not ideal, let it be assumed that the amplitude time characteristic of the degraded output signal $y$ of the system 11 is substantially Gaussian and is superimposed on a noise level of intensity $y_b$ as shown in FIG. 2a. Accordingly, the degraded output signal $y$ and its first and second derivatives ẏ and ÿ shown in FIG. 2 may be represented by the following equations:

$$y = f(t) = \frac{1}{\tau} e^{-\rho t^2} + y_b \qquad (2)$$

$$\dot{y} = \frac{2\rho t}{\tau} e^{-\rho t^2} \qquad (3)$$

$$\ddot{y} = \frac{2\rho t}{\tau} e^{-\rho t^2}(1 - 2\rho t^2) \qquad (4)$$

Minus janitizing ẏ with respect to ÿ in the enhancer 25 provides the signal $$\dot{y}_{-j2}$$

represented in dashed lines superimposed over the representation of $y$ in FIG. 2 which signal $$\dot{y}_{-j2}$$

is applied to the amplitude adjusting device 41. The enhancer output signal $z_e$ representing some magnitude $\alpha$ of the signal $$\dot{y}_{-j2}$$

as set by the operator is summed with the degraded signal $y$ in the summing device 47. Assuming in (1) that $\Gamma=1$ and $\beta=0$, the output signal $y_t$ of the summing device 47 has a form like that represented in FIG. 2. It should be noted that the output signal $y_t$ not only substantially conforms in shape to the rectangular pulse A as desired but also implied that all the spatial harmonics in the object are represented in the edge-sharpened image although some harmonics have larger amplitudes than would be the case in the ideal rectangular pulse.

In the event that the contrast of the displayed image is not subjectively considered to be sufficient, the contrast enhancer 28 may be operated to introduce more contrast without increasing the noise level. The bias adjuster 26 is set so that the noise level $y_b$ is eliminated, producing $y'$ as indicated in FIG. 2. The output signal of the integrator 44 may be expressed as $$\int_0^t y'_{j1} dt \text{ and}$$

generally may be considered as indicating the area under output signal $$y'_{j1}$$

of the switch 43, represented in FIG. 2. Summing the degraded signal $y$ with some adjustable magnitude $\beta$ of the integrated janitized signal indicated as $z_c$, in FIG. 2c, increases the relative amplitude of $y_t$ as is indicated in FIG. 2 by the curve $y_t$ superimposed for comparison purposes over the representation of the degraded signal $y$. The resulting increase in contrast, of course, may be further increased over that provided by the ideal rectangular pulse A. The effect of combining both an edge sharpness enhancing signal $z_e$ and a contrast enhancing signal $z_c$ with the degraded signal $y$ to produce $y_t$ is represented in FIG. 2 wherein the brightness of the center of the edge enhanced image is increased the greatest degree.

Figure 3:
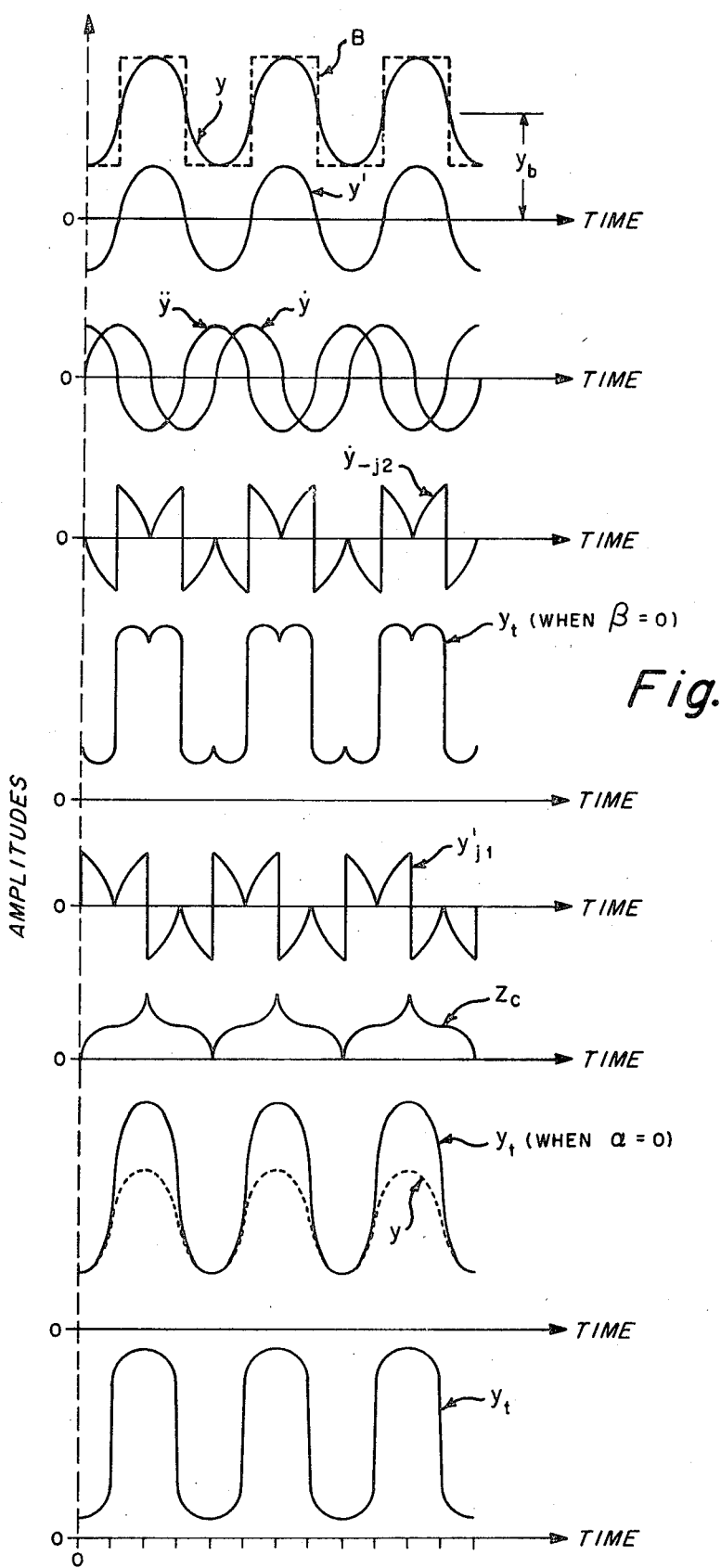
FIG. 3 represents a timing diagram of various signals present in the apparatus of FIG. 1 when a series of equal width bars is being scanned.

Referring to FIG. 3 as a further example, consider a repetitive image comprising a series of black bars interspersed with white spaces of equal widths. Under ideal conditions, the signal $y$ will be a rectangular wave shown in dashed lines in FIG. 3 and having a bias level $y_b$ equivalent to the average of the maximum and minimum intensities. The Fourier series for a 6). wave is, as a function of distance $x$:

$$B = f(x) = y_b + \frac{2y_c}{\pi} \sum_{m=1}^{\infty} \frac{1}{m} \sin \frac{2\pi m x}{L} \quad (5)$$

wherein the bias intensity $y_b$ equals half the sum of the maximum and minimum intensities, the contrast intensity $y_c$ equals half the difference of the maximum and minimum intensities, $L$ is a wavelength in millimeters, and $m$ is any odd integer. The spatial frequency $k$ in cycles per millimeter may be represented by equation (6.

$$k = 1/L \quad (6)$$

Substituting equation (6) and into equation (5) and expanding equation (5) provides the following equation (7):
$B = y_b + 2y/\pi[\sin(2\pi kx) + 1/3 \sin 3(2\pi kx) + 1/5 \sin 5(2\pi kx) + \ldots]$ (7)
which illustrates that the ideal signal $B$ as a function of distance $x$ of the traversing scan includes both the fundamental spatial frequency and its odd harmonics. Assuming that the line-scan-imaging system 11 has such poor transfer characteristics that only the fundamental of the spatial frequencies is passed, the higher harmonics being so attenuated as to be negligible, and assuming that the amplitude of the fundamental is substantially the same as that of the ideal square waveform $B$, the degraded signal $y$ as a function of time becomes $$y = f(t) - y_b + 2y_c/\pi \sin 2\pi k v_b t \quad (8)$$

wherein the term $x$ of equation (7) has been replaced by the product $v_b t$ of the scanning beam velocity $v_b$ of the system 11 and time $t$. Accordingly, since the temporal angular frequency $\omega$ in radians per second may be represented by:

$$\omega = 2\pi k v_b \quad (9)$$

equation (8) becomes $$y = f(t) = y_b + 2y_c 1\pi \sin \omega t \quad (10)$$

whose waveform is indicated in FIG. 3 and which when applied to the display 13 would normally yield a television monitor picture with poor edge resolution because of blurring.

The missing or sharply attenuated odd harmonics of the degraded signal as indicated for the ideal case by equation (7) can be substantially restored by the edge sharpness enhancer 25. The first and second derivatives of equation (10) are:

$$\dot{y} = \frac{2y_c \omega}{\pi} \cos \omega t \quad (11)$$

$$\ddot{y} = \frac{-2\omega^2 y_c}{\pi} \sin \omega t \quad (12)$$

whose waveforms are indicated in FIG. 3. The signal $$\dot{y}_{-j2}$$

expressed as the Fourier series generated from equations (11) and (12) is $$\dot{y}_{-j2} = \frac{2\omega y_c}{\pi} \left\{ \sin \omega t + \sin 3\omega t + \frac{1}{3} [\sin 5\omega t + \sin 7\omega t] \right.$$
$$\left. + \frac{1}{5} [\sin 9\omega t + \sin 11\omega t] + \ldots \right\} \quad (13)$$

whose waveform is represented in FIG. 3. The summing device 47 sums $y$ with some magnitude $\alpha$ of $$\dot{y}_{-j2}$$

to yield, for the case wherein $\beta = 0$:

$$y_t = y_b + \frac{2y_c}{\pi} \left\{ (1 + \alpha\omega) \sin \omega t + \omega \left[ \sin 3\omega t + \frac{1}{3} (\sin 5\omega t \right. \right.$$
$$\left. \left. + \sin 7\omega t) + \ldots \right] \right\} \quad (14)$$

whose waveform is represented in FIG. 3.

It can be seen from equation (14) that the janitized signal $$\dot{y}_{-j2}$$

accentuates the higher frequencies and therefore brings out details in the visual display. Additionally, since the magnitude of $$\dot{y}_{-j2}$$

is proportional to the fundamental frequency, the characteristic may be used to compensate for the falling off of spatial frequency response. The visual picture provided by the display 13 can be made to appear more crisp by increasing $\alpha$.

As in the case for the Gaussian pulse, the contrast of the degraded image can be increased by the enhancer 28 by accentuating the lower frequencies. Since the bias adjuster 26 removed the bias signal $y_b$ from the degraded signal $y$ of equation (10) to avoid, among other things, the problem of adjacent image merger, the bias adjusted signal $y'$ which is to be plus janitized with respect to the first derivative $y$ may be expressed as:

$$y' = 2y_c/\pi \sin \omega t \quad (15)$$

whose waveform is indicated in FIG. 3. The signal $$y'_{j1}$$

expressed as the Fourier series generated from equations (15) and (11) is $$y'_{j1} = \frac{2y_c}{\pi\omega} \left\{ (\cos \omega t - \cos 3\omega t) + \frac{1}{3} (\cos 5\omega t \right.$$
$$\left. - \cos 7\omega t) + \ldots \right\} \quad (16)$$

whose waveform is represented in FIG. 3 and which may be integrated and gain adjusted to develop the corrective signal $z_c$ from the enhancer 28 which may be expressed in series forms as $$z_c + \beta \int_0^t y'_{j1} dt = \frac{2y_c \beta}{\pi\omega} \left\{ \sin \omega t = \frac{1}{3} \sin 3 \omega t \right.$$
$$\left. + \frac{1}{15} \sin 5 \omega t - \frac{1}{21} \sin 7\omega t + \ldots \right\} \quad (17)$$

which is represented in FIG. 3. From the above, it appears that integrating the janitized degraded signal produces a corrective signal $z_c$ for addition to the degraded signal $y$ which emphasizes the low frequencies and wherein the amplitude of the series varies inversely as the frequency. Assuming that $\alpha$ equals 0, the output signal $y_t$ of the summing device 47 as indicated in FIG. 3 is $$y_t = \frac{2y_c}{\pi} \left\{ \left(1 + \frac{\beta}{\omega}\right) \sin \omega t + \frac{\beta}{\omega} \left(-\frac{1}{3} \sin 3\omega t + \frac{1}{15} \sin 5\omega t \right.\right.$$
$$\left.\left. - \frac{1}{21} \sin 7\omega t + \ldots \right)\right\} \quad (18)$$

which signal enables a display of greater contrast than does the degraded signal $y$. This is true even though the fundamental may be so attenuated that the amplitude of the fundamental no longer equals that of the rectangular waveform $\beta$ which would be produced under ideal conditions.

When both some magnitude $\beta$ of the contrast enhancing signal $z_o$ and some magnitude $\alpha$ of the edge sharpening signal $z_e$ are present, the total signal $y_t$ from the summer 47 may be derived by combining equations (14) and (18) to provide the waveform of equation (19)

$$y_t = \frac{2y_c}{\pi} \left\{ \left(1 + \alpha\omega + \frac{\beta}{\omega}\right) \sin \omega t + \left(\alpha\omega - \frac{\beta}{3\omega}\right) \sin 3\omega t \right.$$
$$\left. + \left(\frac{\alpha\omega}{3} + \frac{\beta}{15\omega}\right) \sin 5\omega t + \left(\frac{\alpha\omega}{3} - \frac{\beta}{21\omega}\right) \sin 7\omega t + \ldots \right\} \quad (19)$$

whose waveform is indicated in FIG. 3h.

It is to be noted from equation (19) that the coefficients of the terms of course determine the waveform of the resultant signal $y$. It is apparent for low frequencies that the $\alpha$ term of the coefficient dominates since the limit of the product $\alpha\omega$ approaches 0 as $\omega$ approaches 0 while the limit of the quotient $\beta/\omega$ approaches infinity as $\omega$ approaches 0. Correspondingly, for higher frequencies, the the $\alpha$ terms of the coefficients dominate since the limit of the product $\alpha\omega$ approaches infinity as $\omega$ approaches infinity and the limit of the quotient $\beta/\omega$ approaches 0 as $\omega$ approaches infinity. The rate at which the limits are approached is, of course, determined by the relative magnitudes of $\alpha$ and $\beta$ which are set by the gain adjusters 41 and 45. As indicated above, any desired combination of contrast and edge sharpness can be established by tuning the enhanced video signal from the adjusters 41 and 45. The final adjustment provided by the gain adjusting device 48 permits the display of maximum contrast within the dynamic range of the display 13.

As may be indicated by the foregoing examples, the apparatus of FIG. 1 is a valuable tool for analyzing the degraded output signals of imaging systems. By adjusting the various gain adjustment devices 41, 45, 46 and 48, an operator can scrutinize the display 13 and ascertain which degrees of contrast and crispness provide the best or most nearly recognizable display of the line-scan system output signal. The apparatus avoids the defects of known contrast enhancing apparatus which inherently increases not only the contrast level but also the accompanying noise level because of straightforward amplification of the degraded signal. As indicated in the above examples of contrast enhancement, the primary spatial frequencies involved are in a relatively low range, the noise being attenuated since it includes a primarily spectra of higher frequencies. The enhancer 25 provides for increased edge sharpness and picture crispness by taking advantage of not only the benefit of adding the first derivative of the degraded signal but also the benefit of adding the sense of the negative of the second derivative without the deleterious effect of including the noise which would normally accompany direct addition of the negative of the second derivative.

It may be desirable in some situations to modify the apparatus of FIG. 1 as by processing a contrast enhanced, degraded signal with successive enhancing circuitry including differentiators and an edge sharpness such as 25. Additionally, it may be desirable to janitize the degraded signal or one of its derivatives with respect to higher order derivatives than the first or second.

In some situations such as for a substantially repetitive image where the background noise level is greater than the maximum black indicating signal level, it may be desirable to bias the reference level of the contrast enhancing signal $z_c$ so that it has relatively negative portions which are combined to reduce the intensity of the degraded signal $\tau y$. A variable bias adjuster, not shown, may be incorporated for the purpose in the apparatus of FIG. 1 as by electrically interconnecting it between the integrator 44 and the gain adjuster 45. Thereby, the reference level of the signal $z_c$ may be adjusted to a value intermediate the maximum and minimum intensities of $z_c$, enabling the greatest degree of contrast between the points of maximum and minimum brightness in the displayed image while remaining within the dynamic range of the display 13.

Obviously many modifications and variations of the present invention are possible in view of the above teachings. It is therefore to be understood that within the scope of the appended claims the invention may be practiced otherwise than as specifically described.

What is claimed is:
1. Apparatus for processing an electrical input signal to provide a video signal comprising:
   differentiating means adapted to receive the input signal for providing signals indicated in the $n$th and the $(n+k)$th derivatives of the input signal wherein $n$ is any integer including zero and $k$ is any integer greater than zero;
   signal polarity adjusting means connected to said differentiating means to receive said $n$th and $(n+k)$th derivative signal for switching the polarity of said $n$th derivative signal to always bear an opposite polarity relative to the polarity of said $(n+k)$th derivative signal and for providing an output signal linearly indicative of said $n$th derivative signal switched in polarity opposite to the polarity of the $(n+k)$th derivative signal; and
   signal summing means adapted to receive the input signal and connected to said polarity adjusting means for adding the input and adjusting means output signals to provide the video signal.

2. Apparatus according to claim 1 further comprising:
   integrator means electrically interposed between said polarity adjusting means and said signal-combining means integrating said polarity adjusted output signal of said polarity adjusting means.

3. Apparatus according to claim 2 further comprising:
   bias adjuster means connected to receive said $n$th derivative of the input signal for adjusting its polarity reference level to a level between the maximum and minimum intensities of the input signal and providing an output signal indicative of said adjusted $n$th derivative to said polarity adjusting means.

4. Apparatus according to claim 1 wherein said signal polarity adjusting means comprises:
   first polarity detector means for providing a detector output signal indicative that the polarities of said derivatives of said input signal measured relative to respective reference levels have a predetermined relative sense; and
   first polarity reversing means normally providing as an output signal said $n$th derivative of the input signal and responsive to said detector output signal for providing as said output signal said $n$th derivative signal having a reversed polarity.

5. Apparatus according to claim 4 further comprising:
   said first detector means providing said output signal indicative that said $n$th and $(n+k)$th derivatives have opposite polarity.

6. Apparatus according to claim 4 further comprising:
   said first detector means providing said output signal indicative that said $n$th said $(n-k)$th derivatives have the same polarity.

7. Apparatus according to claim 4 further comprising:
   said means providing said derivative indicating signals including first and second differentiating means serially connected for providing signals indicative of respectively the first and the second derivatives of the input signal;
   said first detector means providing said detector output signal indicative that said first and second derivatives have the same polarity; and
   said first polarity reversing means providing said first derivative signal as polarity adjusted in response to said first detector output signal.

8. Apparatus according to claim 7 further comprising:
variable means for adjusting the magnitude of electrical signals applied thereto and electrically interposed between said first polarity reversing means and said signal-combining means.

9. Apparatus according to claim 4 further comprising:
said means providing said derivative indicating signals providing the zero derivative of the input signal and including first differentiating means for providing the first-derivative of the input signal;
said first detector means providing said detector output signal indicative that said zero and said first-derivative signals have opposite polarities;
said first polarity reversing means providing said zero-derivative signal as polarity adjusted in response to said first detector output signal; and
integrator means electrically interposed between said polarity-reversing means and said signal combining means for integrating said polarity-adjusted zero-derivative signal.

10. Apparatus according to claim 9 further comprising:
variable means for adjusting the magnitude of electrical signals applied thereto and electrically interposed between said integrator means and said signal-combining means.

11. Apparatus according to claim 9 further comprising;
said means providing said derivative-indicating signals further including second differentiating means for providing the second derivative of the input signal;
second polarity detector means connected for receiving said first and second-derivative signals for providing a second detector output signal indicative that said first and second derivatives have the same polarity; and
second polarity-reversing means providing to said signal-combining means said first derivative signal as polarity adjusted in response to said second detector output signal.

12. Apparatus according to claim 11 further comprising:
first, second, third, and fourth variable means for adjusting the magnitude of electrical signals and being respectively electrically connected for receiving and adjusting the input signal, for receiving and adjusting the output signal of said integrator means, for receiving and adjusting the output signal of said second polarity-reversing means and for receiving and adjusting said output signal of said signal-combining means to provide the video output signal.

13. Apparatus according to claim 12 further comprising:
variable bias adjuster means connected to receive the input signal for adjusting its polarity reference level to a level between the maximum and minimum intensities of the input signal and providing an output signal indicative of said adjusted zero derivative to said first detector means and to said first polarity-reversing means.

14. Apparatus for processing an electrical input signal to provide a video output signal comprising:
differentiating means adapted to receive the input signal for providing signals indicative of the first and the second derivatives of the input signal;
signal polarity-adjusting means connected to said differentiating means to receive said first and second derivative signal for switching the polarity of said first derivative signal to always bear an opposite polarity relative to the polarity of said second derivative signal and for providing a first corrective signal linearly indicative of said first-derivative signal switched in polarity opposite to the polarity of the second derivative signal;
integrating means adapted to be connected to receive the input signal for providing a second corrective signal indicative of the integration of a polarity adjustment of the input signal which adjustment has a polarity the same as that of the first derivative of the input signal; and
signal summing means connected to said signal polarity adjusting and integrating means for receiving and adding said first and second corrective signals with the input signal to provide the video output signal.

15. Apparatus according to claim 14 further comprising:
said signal polarity-adjusting and integrating means each including variable means electrically interposed for adjusting the relative magnitude of the respective one of said first and second corrective signals.

16. Apparatus according to claim 15 wherein said integrating means includes;
variable bias-adjuster means connected to receive the input signal for adjusting its polarity reference level and providing an output signal;
adjustment means receiving said bias-adjuster output signal for providing said polarity adjustment having a polarity the same as that of said bias-adjuster output signal; and
integrator means for receiving and integrating said polarity adjustment to provide said second corrective signal.

* * * * *